Doyle D. Mize
Peter C. Sundt
Marvin A. Drews
INVENTORS

April 18, 1961 D. D. MIZE ET AL 2,980,885
SEISMIC RECORDING AND PLAYBACK APPARATUS
Filed Nov. 25, 1957 5 Sheets-Sheet 4

Doyle D. Mize
Peter C. Sundt
Marvin A. Drews
INVENTORS

BY James G. Ulmer
Delmar L. Sroufe
ATTORNEYS

United States Patent Office 2,980,885
Patented Apr. 18, 1961

2,980,885
SEISMIC RECORDING AND PLAYBACK APPARATUS

Doyle D. Mize, Peter C. Sundt, and Marvin A. Drews, Houston, Tex., assignors to Mandrel Industries, Inc., Houston, Tex., a corporation of Michigan Filed Nov. 25, 1957, Ser. No. 698,766

5 Claims. (Cl. 340—15)

This invention relates to seismic prospecting, and more particularly to improvements in apparatus for recording and playing back seismic waves.

Seismic prospecting requires accurate analysis of percussion waves set up near the surface of the earth by explosive or other means and reflected and refracted back from subsurface formations to the surface. Analysis of waves arriving back at the surface is facilitated by comparing their arrival times at a number of different points. To that effect, it is customary to arrange a distribution, or spread, of receiving devices, or geophones, outward from the blast location and simultaneously to record on a multi-trace record the waves which come back to them.

Those skilled in the art of seismic prospecting are able to analyze the simultaneous recording of the signals from the geophones to obtain valuble information concerning the depth, shape, thickness, composition, and other characteristics of the underlying strata. Such analysis is furthered by providing means for eliminating from the multi-trace recording certain ascertainable time variations which if not corrected for would obscure desired information relating to the strata being explored.

The multi-trace record itself may take one of several different forms, it being customary under the present practice to record the signals from the geophones side by side on a strip of magnetic or photographic material. The magnetizable medium has more utility in many applications, because, among other reasons, a magnetic trace is easily played back repeatedly, it requires no developing, it may be wiped off so that the tape may be used repeatedly, and it is more readily adapted to frequency spectrum analysis and other specialized techniques which are known in the art.

The corrections for the time variations referred to are customarily classified as being either static or dynamic corrections. There are a number of factors which make up the static correction. Some of the more important static correction factors are differences in thickness of the weathered layer which exists over most of the land surface of the earth, differences in the propagation velocity of the material composing the weathered layer in the vicinity of each geophone, and differences in elevation of the surface of the earth between geophones. The static correction tends to remain the same for waves arriving back at the surface from all depths, and it therefore may be introduced into the recording or playback apparatus as a fixed quantity for each geophone.

The dynamic correction is necessitated primarily by the geometry of the spread of geophones and by the average velocity characteristics of the earth in the region. The travel time from the blast location to each geophone increases with distance. That is true for waves reflected back from the sub-surface strata as well as for waves traveling direct from the blast to the geophones. As the depth of the formations increases and the total travel time of the waves becomes greater, however, the relative importance of the spacing of the geophones diminishes. Therefore the amount of dynamic correction is generally greatest for the earliest reflections, and means must be provided to diminish it continuously as later and later reflections arrive back at the surface.

From the foregoing it may be seen that the art of seismic prospecting will be advanced in important particulars by improved apparatus for quickly and accurately inserting and controlling both static and dynamic corrections in the recording or playback of multi-trace seismic records. We have invented such an apparatus, and in accomplishing this we have also provided means for solving the problems of synchronizing the recording and playback cycles accurately in relation to each other and to the time of the initial blast.

It has long been desirable to perfect the foregoing properties in an apparatus in which the strip of recording or storage medium was passed over a flat bed rather than around a large drum during the recording and playback cycles, and in our invention this has been done. We have, moreover, adapted the flat bed type of seismic recorder and playback apparatus for field use by achieving the requisite simplicity, compactness, accuracy, and ease of operation.

Among the objects of our invention, therefore, are the following:

It is an object of our invention to provide precise correcting means for inserting static corrections in the recording or playback of multi-trace seismic recordings.

It is a further object or our invention to provide means whereby dynamic corrections can be accurately introduced into the recording or playback of multi-trace seismic recordings.

It is a further object of our invention to provide effective timing means for synchronizing the recording and playback cycles and improved means for driving and controlling seismic recording and playback apparatus.

It is a further object of our invention to provide an improved multi-trace seismic recording and playback apparatus with a flat bed support for the strip of recording medium.

For a more detailed explanation of our invention and of the purposes and advantages thereof, we refer to the following drawings which are a part of the specification.

Figure 1:
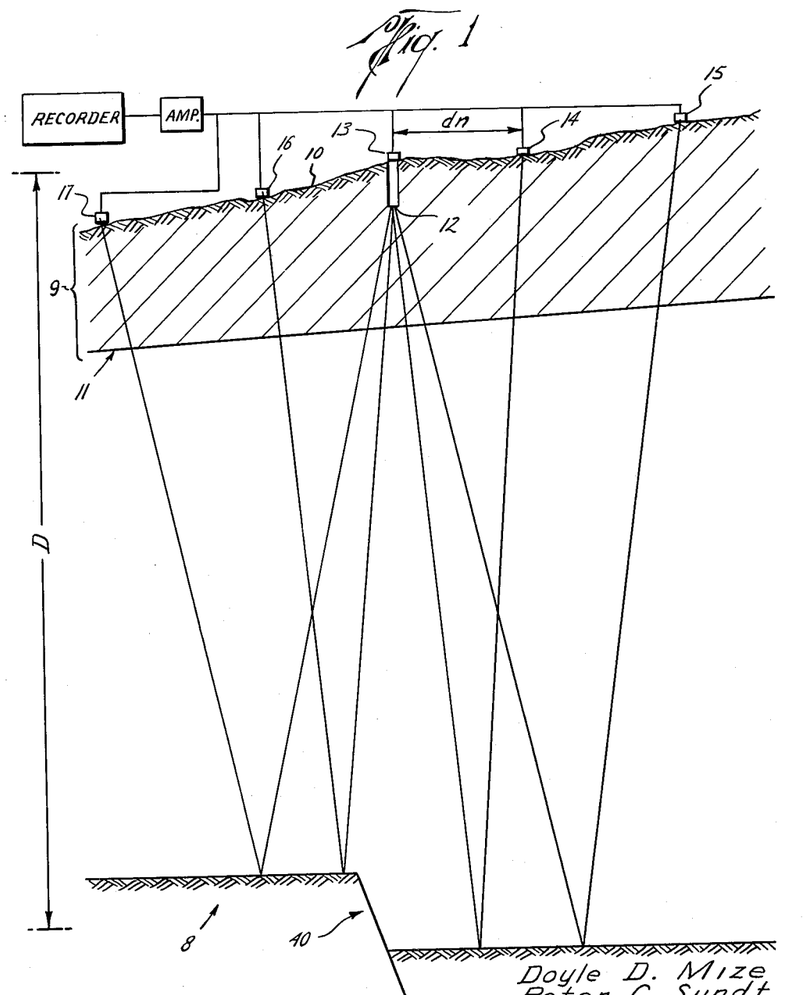
Fig. 1 is an illustration of a section of the crust of the earth showing the path of seismic waves from the blast to the geophones.

Referring to the drawings, Fig. 1 illustrates a vertical section of the earth's crust and the reasons necessitating the static and dynamic corrections for which we have made provision in our apparatus. For some distance 9 below the surface 10 of the earth there exists a weathered layer 11 of unconsolidated ground. The weathered layer 11 varies in thickness from practically none in certain rocky areas of the earth to several hundred feet in other areas. The density of the material composing the weathered layer 11 is generally lower than the density of the lower strata, and the velocity of waves in the weathered layer is considerably less than the velocity of waves in the lower strata. This accentuates the effects of irregularities in the weathered layer upon waves passing through it. Moreover, the weathered layer is less homogeneous than the lower strata, and its velocity characteristics often vary widely within a small area. For these reasons, the weathered layer has considerable influence upon the relative travel times of waves passing through it at different locations. The purpose of the static correction is to normalize that influence so that the irregularities of the weathered layer do not distort the relationship of the reflection travel times to the geophones from lower strata.

Various techniques are known for determining the static correction for each geophone location. Those methods use, among other data, information as to the velocity of waves in the weathered layer. Such information may be obtained by recording on the multi-trace record the direct wave travel time from the blast point 12 beneath the surface to a geophone 13 on the surface 10 directly above. This time is called the up hole time. More detailed velocity information may be obtained by recording the direct wave travel time from the blast point to each outlying geophone, 14, 15, 16, and 17. For use in determining the static correction it is often desirable to make the first recording without any correction and to make it on both magnetic tape and photographic film. The static corrections are then determined from the uncorrected photograph and inserted manually into he magnetic recording and playback apparatus before one or more subsequent photographic recordings are made from the magnetic tape recording by playing it back through amplifiers into a photographic recorder.

The static correction may also correct for differences of elevation between geophone locations. The static correction insertion means may be used to refer the entire record to a datum plane other than the actual elevation of the geophone spread.

The dynamic corrections are illustrated also by Fig. 1. Dynamic corrections are necessitated by the geometry of the geophone spread and by the velocity function of the earth below the weathered layer in the region under study. It will be seen from the following discussion that the dynamic correction, sometimes called the moveout correction, is larger as the distance from the blast to the geophones increases and that the dynamic correction diminishes continuously for all recording and playback heads as the playback run progresses.

In Fig. 1, disregarding for the time being the irregularities of the weathered layer, for which static corrections have already been described, the average vertical distance to the reflecting formation is D. We define $t_0$ as the vertical reflection time. The direct distance from the blast point to any given geophone N is denoted by $d_n$. The reflection time to such geophone N is denoted by $t_n$. The average velocity of percussion waves in the earth for the region being studied is denoted by V. These parameters are related as follows:

$$t_0 = \frac{2D}{V}$$

$$t_n = \frac{2\sqrt{D^2 + \frac{d_n^2}{4}}}{V} = \sqrt{\frac{4D^2}{V^2} + \frac{d_n^2}{V^2}}$$

$$t_n = \sqrt{t_0^2 + \frac{d_n^2}{V^2}}$$

We define $\Delta T_n$ as the difference between the time of arrival of a reflection at a given geophone N and the time of arrival of the same reflection at a geophone directly over the shot point. Therefore:

$$\Delta T_n = t_n - t_0$$

$$\Delta T_n = \sqrt{t_0^2 + \frac{d_n^2}{V^2}} - t_0$$

Figures 2, 6:
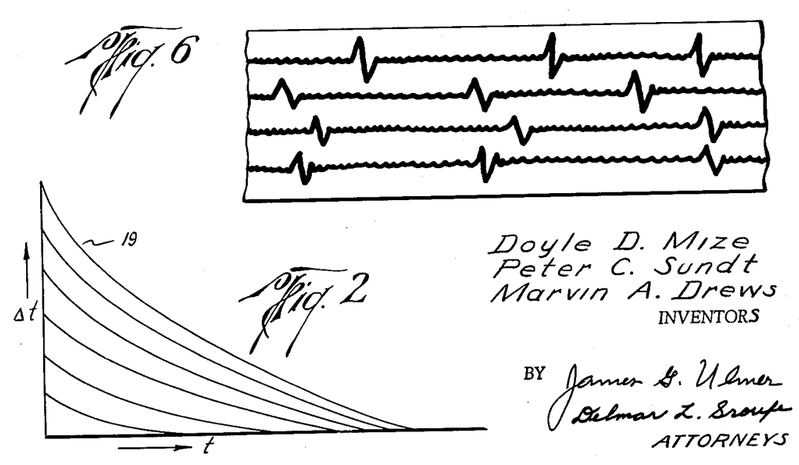
Fig. 2 is a plot of the dynamic correction function.
Fig. 6 shows a diagrammatic representation of a multi-trace seismic recording in which neither static nor dynamic corrections have been made.

From the foregoing expression for $\Delta T$, the amount of correction that must be applied to each trace is illustrated by the family of curves shown in Fig. 2 in which each curve represents the locus of $\Delta T$ corrections for a different geophone. The family of curves represents a hypothetical spread of seven geophones at different distances from the blast point in which the sequence of curves from lowest to highest corresponds with the near to far distances to the respective geophones from the shot point. We have provided a family of cams represented in Fig. 12 by typical cam 20. The contours of this family of cams are patterned from the family of curves 19 as our preferred means for introducing the dynamic corrections. Experience has taught that the same family of cams 20 generally can be used throughout the same geological region of the earth if the same spread configuration is used each time, because the average velocity of the subsurface material below the weathered layer remains reasonably constant over large areas. We have provided means for removing the entire cam shaft 21 with its family of cams 20 and installing a new set when the apparatus is to be used in a different geological region of the earth or when it is to be used with a different spread configuration.

Figure 3:
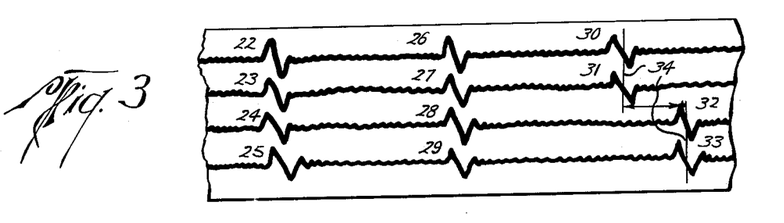
Fig. 3 shows a diagrammatic representation of a seismic multi-trace recording after both static and dynamic corrections have been made and showing a subsurface anomaly.

Fig. 3 illustrates diagrammatically the appearance of a seismic recording on a photographic strip of data received by four representative geophones 14, 15, 16, 17 when both dynamic and static corrections have been made. The four irregularities 22, 23, 24, 25 in the traces near the left end of the strip are lined up with each other as are the four irregularities 26, 27, 28, 29 at the center. Those irregularities represent reflections to four geophones 14, 15, 16, 17 from substantially flat and level hypothetical strata at two different depths. The geophones are spaced two on each side of the blast point. The four irregularities near the right end of Fig. 3 do not line up, and because the record has been fully corrected the break in the line 34 drawn between the four irregularities signifies the presence of fault 40 as depicted in Fig. 1. The break in line 34 is easily discernable upon visual inspection of a photographically transcribed record because the insertion of static and dynamic corrections factors has eliminated all unwanted time variations.

Figure 4:
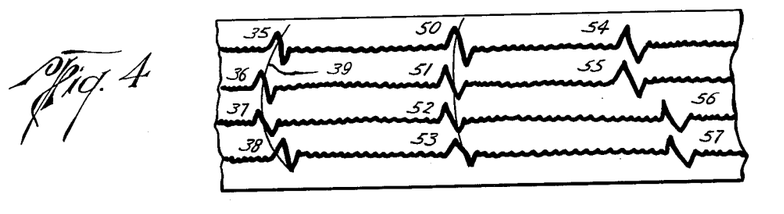
Fig. 4 shows a diagrammatic representation of a multi-trace seismic recording in which the static correction only has been made.

Fig. 4 represents the appearance of a multi-trace seismic recording of the same formation as depicted in Fig. 3 but in which the dynamic correction has not been made but in which the static correction has been made. The four irregularities 35, 36, 37, 38 to the left of Fig. 4 are grouped in formation having a pronounced hyperbolic shape as shown by line 39. We prefer to arrange the order of the tracings so that the outermost upper and lower traces are recorded from two geophones spaced farthest out on opposite sides from the shot point and other geophone tracings being spaced inwardly on the strip in order of their distances from the shot point with traces of all geophones on one side of a shot point arranged on one side of the photographic strip. The irregularities to the left of Fig. 4 represent reflections from a flat surface relatively near the surface of the earth, but because the dynamic correction has not been made the irregularities are not on a straight line. The irregularities 50, 51, 52, 53 at the center of this figure show a lesser amount of hyperbolic curving, because the effect of the dynamic correction factors diminishes as waves are received back from greater and greater depth. The dynamic correction factors influence the four irregularities 54, 55, 56, 57 to the right end of Fig. 4 to a still lesser extent, but even small unwanted time interference results in a considerable visual obscurity of the discontinuity which in line 34 of Fig. 3 so clearly denoted the existence of a subsurface fault 40.

Figure 5:
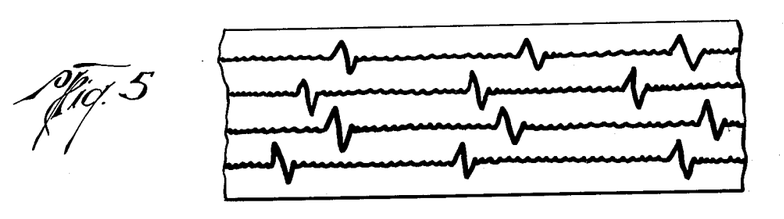
Fig. 5 shows a diagrammatic representation of a multi-trace seismic recording in which the dynamic correction only has been made.

Fig. 5 is another representative appearance of a seismic recording of the same formation as was recorded in Fig. 3, but one in which the dynamic correction had been introduced but the static correction had been omitted. All of the wave irregularities in this figure are staggered in random relationship to each other as a result of the irregular variations of the static correction factors from geophone to geophone. As a result, the discontinuity in a line joining the four irregularities to the right end of Fig. 5, which clearly appears in line 34 of Fig. 3 is again obscure.

Fig. 6 shows the appearance of a similar multi-trace seismic recording of the formation depicted on Fig. 3, but in which neither static nor dynamic corrections have been introduced. Obscurities present in Fig. 4 and Fig. 5 are added in Fig. 6 with the result that the break in line 34 which was evidence of the fault 40 in the subsurface structure 8 shown in Fig. 1 is heavily obscured. The object of inserting static and dynamic corrections is to reverse the process and achieve maximum clarity of indication as to the subsurface structure.

Figures 7, 8, 9:
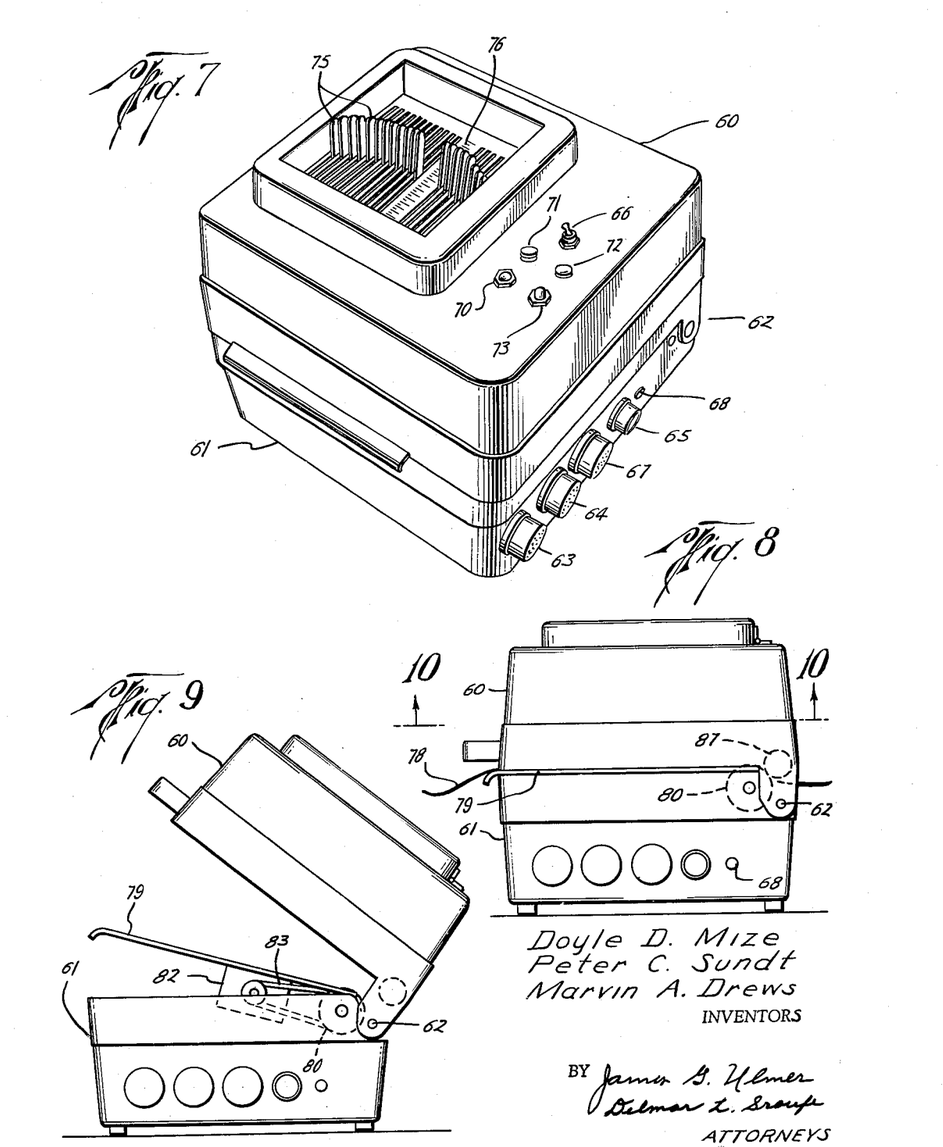
Fig. 7 is an axonometric projection of one embodiment of our invention.
Fig. 8 is a side elevation of the embodiment of our invention shown in Fig. 7.
Fig. 9 is a side elevation of the embodiment of our invention shown in Fig. 7 but with the upper and lower cases opened apart and with the flat bed raised.

Fig. 7 is an axonometric projection of a presently preferred embodiment of our apparatus. It comprises an upper case 60 and a lower case 61, and these are hinged together at the pivot 62 to the back of the apparatus so that they close tightly together over the internal parts to protect them from dust and other foreign substance. The apparatus receives a plurality of seismic signals through sockets 63 and 64 and imparts playback signals through the same sockets. Electric power at 12 volts direct current is received through socket 65, and within the apparatus the power is turned on and off by the main switch 66. Electric control cables to an external switch box for operating the apparatus in conjunction with a system of seismic amplifiers and photographic recorders may be connected with socket 67. An electrical impulse to detonate an explosive is imparted through jack 68.

The apparatus is set up for either record or playback function by pressing and releasing switch button 70, and a green light 71 indicates when it is set for record while an amber light 72 indicates when it is set for playback. The recording or playback run is started by pressing the motor button switch 73, and continues so long as the button switch 73 is held down. The usual recording run requires fewer than ten seconds but may be as long as desired. We have arranged these control circuits by conventional means so that the apparatus automatically reverts to playback condition after each run to forestall inadvertent operation in record position.

Levers 75 are provided for inserting static corrections into the apparatus. A scale 76 calibrated in milliseconds in opposite directions from a zero point is provided for each lever 75 so that it may be set accurately for the desired advance or retard. In Fig. 7 the scale 76 is represented as being flat, but in Fig. 12 we have shown the scale 76 as being rounded to illustrate possible variations of our apparatus. Throughout this description, we show a specific preferred embodiment of our apparatus, but it will be understood that we do not thereby limit ourselves to any particular structure or form of the elements claimed. In the illustrated embodiment, we have provided for a static correction up to plus or minus 50 mililseconds, which is adequate for most static corrections required in the field. The levers are customarily set at zero correction during the recording run. They are then set for the necessary static corrections before the playback run is started.

Fig. 8 is a side elevation of the same embodiment of our invention. It shows the strip of magnetic tape 78 passing through the apparatus between upper case 60 and lower case 61. The usual seismic recording is a few feet long, and we have improved the facility with which the strip of tape 78 may be passed through the apparatus for recording and then be repassed through the apparatus repeatedly for playbacks by avoiding rolling the tape up at any point and by simply passing it through the machine from front to back over the flat bed 79 and drive roller 80.

Fig. 9 is a side view of our flat bed recorder and playback apparatus with the upper case 60 pivoted upward as in loading with a strip of magnetic tape. The flat bed 79 is also shown pivoted upward from the lower case 61 in which it normally lies during operation of the apparatus. The flat bed 79 may be thus pivoted to provide access to the mechanical and electrical components underneath when servicing is performed.

Fig. 9 also shows the tape drive motor 82 attached to the bottom of the flat bed 79. The motor 82 rotates a tape drive roller 80 at constant speed by means of belt 83, and the roller carries two sprocket wheels, one wheel being located near each end of the shaft. The two sprocket wheels engage with a line of perforations along each side of the magnetic tape to assist and stabilize the friction drive of the tape drive roller against the pressure roller 87.

The constant speed tape drive motor 82 is powered in this embodiment of our invention by a 400 cycle, 115-volt power inverter contained in the lower case and operating from a 12-volt direct current external source. The power inverter comprises a precise 800 cycle per second master tuning fork, a binary counter system for counting down the frequency from 800 to 400 cycles per second, and a transistorized power amplifier for increasing the output to 115 volts as required by the tape drive motor. The same source of constant electrical frequency is used to power the camshaft governor motor 95 and the circuits for producing a precise 100 cycle frequency and a 16 kilocycle bias frequency which are mentioned later.

Figures 10, 11:
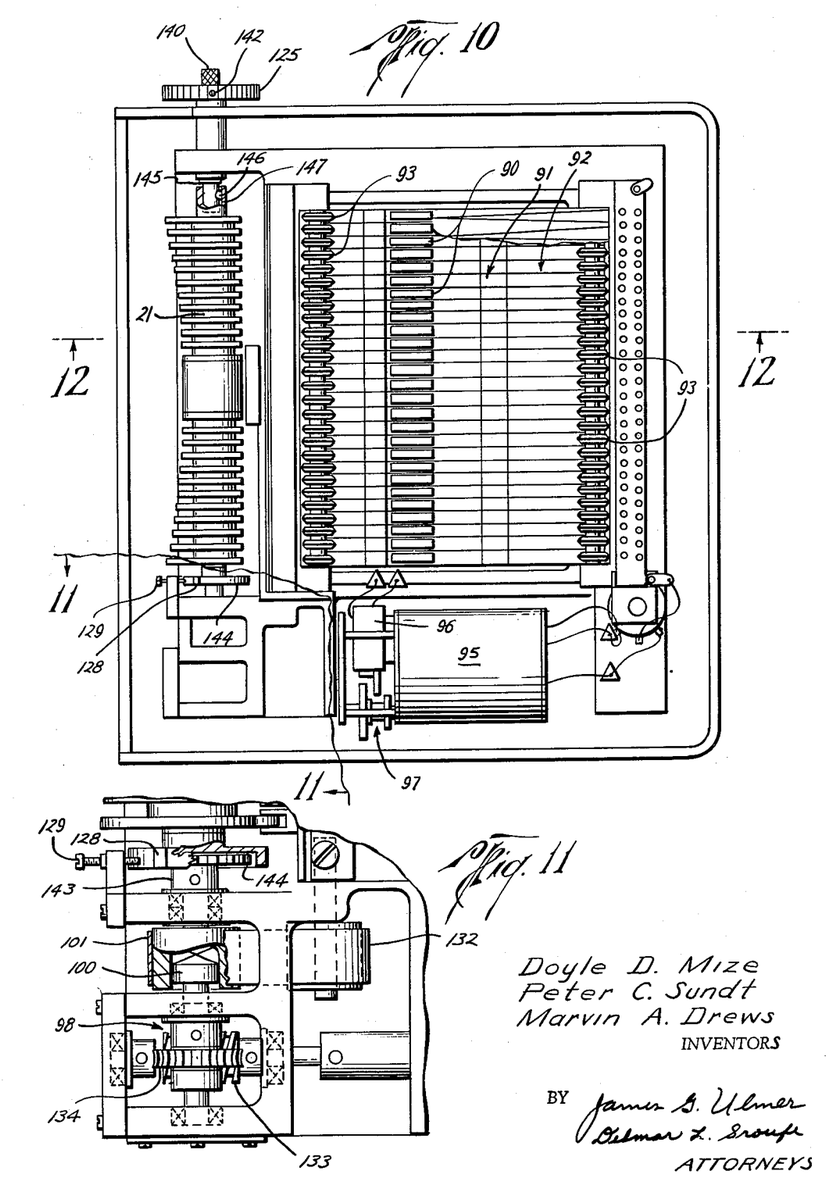
Fig. 10 is a bottom view of the upper case of our apparatus.
Fig. 11 is a detail of part of the worm gear and overriding clutch drive shown in Fig. 10.

Fig. 10 is a bottom view of the upper case at the section line 10—10. The recording and playback heads 90 are positioned side by side before any static or dynamic correction is inserted. The heads 90 are slid backward and forward along the longitudinal axis of their traces to put corrections into the apparatus. The heads are carried by the head yokes 91 which are slidably mounted in the head carriages 92. The head carriages 92 in turn are slidably mounted in the apparatus by means of rollers 93.

The head carriages 92 engage the cams 20 on the camshaft 21, so that rotation of the cam shaft 21 results in motion of each head 90 as its carriage 92 follows its cam 20. Rotation of the cam shaft is controllably limited by the constant speed cam governor motor 95, clutch 96, gear train 97, worm gear 98, and overriding clutch 100. Some of these components are detailed in Fig. 11 and will be described with greater particularity later in this disclosure.

Figure 12:
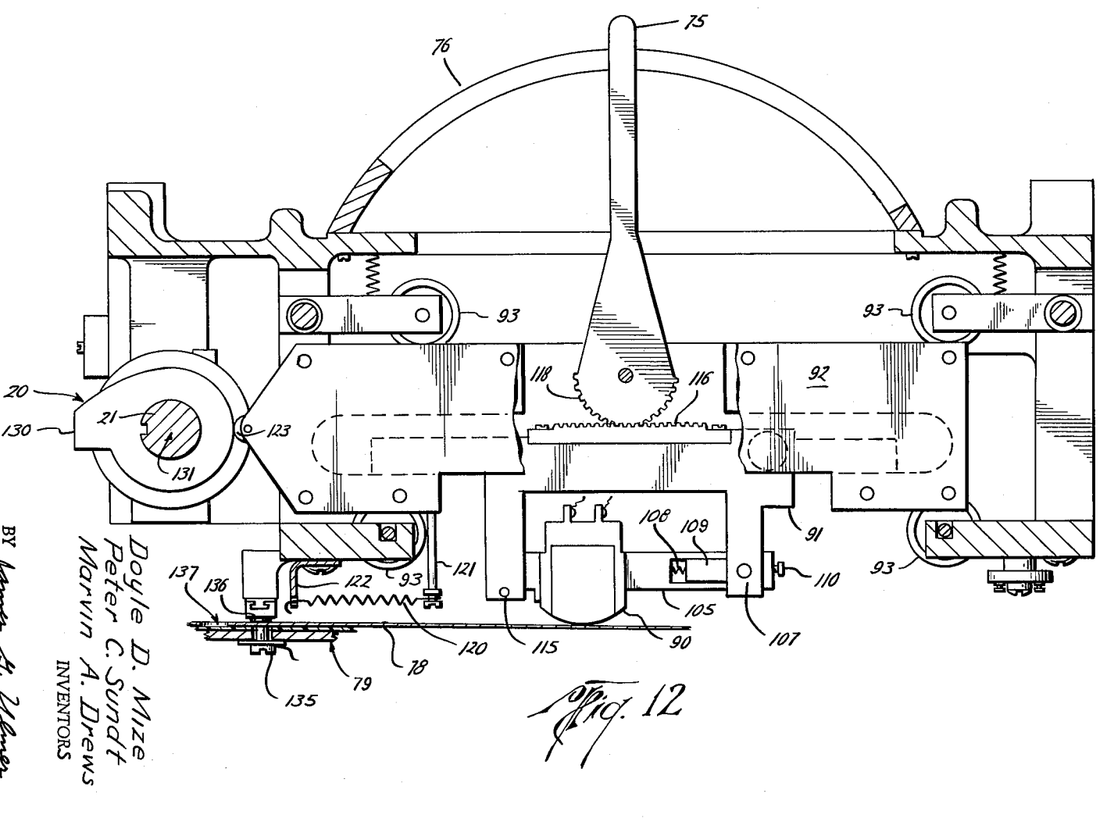
Fig. 12 is a side elevation of one of the recording head carriages together with its dynamic correction cam and related components.

Fig. 12 is a side elevation of the upper case at the section line 12—12 of Fig. 10 and showing the mechanism employed by us for applying static and dynamic corrections to one recording and playback head.

Having thus described the construction of our apparatus, we shall next disclose in detail the mechanisms by which the static and dynamic corrections are inserted.

The static correction inserting means may be seen in Fig. 12. The recording and playback head 90 is mounted in its yoke 91 by bar 105. The recording head yoke 91 is slidably carried by the head carriage 92. Bar 105 is pivotally attached to the yoke 91 at pivot 107. The spring 108, plug 109 and screw 110 mounted in the bar 105 are means for adjusting the position of the head 90 to neutral position when the lever 75 is set at zero on scale 76. The head 90 is held against the magnetic tape 78 by gravity. The magnetic tape 78 slides underneath and in contact with the head 90 while the tape 78 is supported by the flat bed 79. When the upper case 60 is raised, head 90 is stopped from falling by means of the pin 115 which blocks the downward swing of bar 105.

Rack 116 is fastened to the top of yoke 91. Pinion segment 118 is rotatably mounted on the head carriage 92 by means of pin 119 so as to engage rack 116. Lever 75 is attached to pinion segment 118 whereby the head 90 is positioned with respect to its carriage 92 according to the desired static correction. The scale 76, which is depicted as rounded in Fig. 12 and flat in Fig. 7, is calibrated in milliseconds of head displacement each side of neutral for the fixed tape speed of seven and one-half inches per second.

The dynamic correction mechanism for each head is also disclosed in part by Fig. 12. The head carriage 92 is slidably mounted in the apparatus by means of four rollers 93 so that it is free to move the head 90 backward and forward along the longitudinal axis of its recording trace. The tension spring 120 is connected between the bolt 121 on the head carriage 92 and the bracket 122 fastened to the frame of the apparatus. Spring 120 exerts a force on head carriage 92 in the direction toward typical cam 20. A cam follower roller 123 is carried by said head carriage 92 and bears against cam 20 with the force created by spring 120.

At the beginning of the playback run, the camshaft 21 is rotated manually by knob 125 to its starting position, which is a point where the cam 20 produces maximum outward displacement of the cam follower roller 123 and head carriage 93. This position is located by rotating the camshaft until it is stopped by engagement of dog 128 with bolt 129. In that position the dynamic correction displacement is maximum, and the cam follower roller 123 rides on a flat beginning segment 130 of the cam surface at maximum displacement from the cam center 131. The camshaft 21 is automatically held cocked in that position by overriding clutch 100 for release when the dynamic correction run is to start during playback. When the camshaft 21 is released it rotates counterclockwise in Fig. 12, and that continuously reduces the dynamic correction and the slope of the cam 20 at the point of contact with the cam follower roller 123 after the cam follower roller pass off the flat beginning segment 130 and onto the dynamic portion of cam 20.

The motive power of rotation of the cam shaft is supplied in part by springs 120 as their force operates against the slopes of the cams 20 through the cam follower roller 123. Auxiliary motive power to insure rotation when the cam follower engages a point of little or no slope on the cam 20 is supplied by spring 101 which is a constant torque spring motor comprising a strip of resilient material wound around the camshaft 21 and the take-up roll 132.

Each time the camshaft 21 is manually rotated for cocking to its starting position springs 120 and 101 are automatically energized for the next run.

Between the auxiliary spring 101 and the worm gear 98 we employ any suitable means which will transmit torque in the operating direction of rotation only from the camshaft 21 toward the worm gear 98 such as the overriding clutch 100 shown in Fig. 11. This over-riding clutch serves two functions, the first being to permit the camshaft 21 to be rotated for cocking free from stoppage by the low torque efficiency worm gear 98 and the second being to retain the camshaft 21 in starting position. The camshaft 21 does not rotate through a full revolution, because ample dynamic correction can be provided within one revolution. The speed of camshaft 21 is six revolutions per minute, but it is stopped by dog 128 after turning for five seconds. However, since waves arriving from deep formations after five seconds require substantially no dynamic correction, the motor switch 73 may be held down for as many seconds after the fifth second as desired to record deep structures.

The worm gear 98 is inserted in the mechanical linkage between the camshaft 21 and the electric motor 95. The worm wheel 134 connects with the cam shaft 21 through the overriding clutch 100, and the worm 133 communicates with the motor 95 through the speed reduction gear train 97 and the clutch 96.

Because of the low torque efficiency of the worm gear 98 in the direction from the worm wheel 134 toward the worm 133 the springs 120 and 101 which drive the camshaft do not drive the worm 133. Accordingly, the speed at which the springs 120 and 101 rotate the camshaft is limited by the speed of rotation of the worm 133 as fixed by the constant speed worm drive motor 95.

Clutch 96 precisely controls the engagement of the camshaft governor motor 95 with the worm 133 to start the rotation of the worm 133, which in turn permits the camshaft 21 to start rotating under the force of springs 120 and 101 but at a speed which is limited by the constant speed of the worm 133. Clutch 96 is electrically activated by conventional circuitry to engage during playback when the tape 78 reaches the point where it was when the blast was fired during the recording run.

It is an important feature of our invention that the speed of the camshaft 21 is controlled by means which are free from backlash. All motive power for the camshaft 21 is furnished by springs 120 and 101, which operate constantly in the same direction, and the worm gear 98 and motor 95 act only as a constant speed governor. Therefore slack cannot develop in the speed control linkage.

Another important feature of our invention is that the necessity for an electric motor 95 large enough to drive the camshaft 21 is eliminated. Because the motive power comes only from springs 120 and 101, which are automatically energized each time the camshaft is manually cocked, and since the motor 95 needs to be only strong enough to rotate the worm gear 98, a considerably smaller motor 95 may be used. This has the advantages of reduced weight, size, heat, power demand, and cost.

Further understanding of the mechanism of our invention may be gained from observing that the levers 75 accurately indicate the static corrections upon scale 76 only before the camshaft 21 is cocked and only while there is no dynamic correction applied to the heads 90. When dynamic correction is applied, the levers 75 are shifted out of position to indicate static correction accurately on scale 76.

We have arranged for ready removal of camshaft 21 and substitution of a camshaft 21 carrying a different family of cams 20. Camshaft 21 is held in position at one end by shaft 140. Key 146 on shaft 140 engages slot 147 in camshaft 21 to prevent rotational slippage. Shaft 140 passes through the rotatable bushing 145 and through knob 125 which is affixed to rotatable bushing 145. Shaft 140 is held in position by set screw 142 which is seated in knob 125. Rotatable bushing 145 is flanged on the end nearest the camshaft to prevent it from slipping longitudinally in the frame of the apparatus. The other end of camshaft 21 is coupled to shaft 143 by a set of nested concentric inside and outside spur gears 144. Camshaft 21 may be removed by first loosening set screw 142 and then drawing shaft 140 outward. Camshaft 21 may then be slid along its longitudinal axis until said set of nested gears 144 are disengaged and camshaft 21 is freed.

For a description of the means which we have provided for firing the blast shortly after the start of the recording run and for relating the starting of the camshaft on playback to the identical point along the tape where the blast was fired, we again refer to Fig. 12. An electrical contact 135 is imbedded in the flat bed 79 so that it is flush with the upper surface of the bed. A second electrical contact 136 of spring material is mounted in the upper case 60 of the apparatus so that when the cases 60 and 61 are closed together for operation the two contacts are separated only by the magnetic tape 78. The magnetic tape 78 is an electrical insulator, and both contacts 135 and 136 are insulated from the frame of the apparatus. A small hole 137 to be used as an index mark is made near the starting end of the strip tape 78 so that when the hole 137 passes between the contacts 135 and 136 they come into momentary contact. Hole 137 is made with a flat leading edge to sharpen the contact timing. That contact completes a conventional electrical firing circuit to an external blaster through jack 68 and thereby detonates the explosive charge. The contacts 135 and 136 normally make through hole 136 about .3 second after the motor button switch 73 is pressed to commence the recording run.

On playback, the same hole 137 serves as an index mark to synchronize the start of the camshaft 21 relative to the firing of the blast during the recording run. Conventional electrical control means are provided for starting the camshaft speed governor motor 95 on playback at the same time the tape drive motor is started by pressing motor switch 73. Motor 95 is powered by the same constant frequency power source as motor 82, but motor 95 is wired to run only during playback. When the apparatus is set for record, the camshaft 21 is left uncocked and in its run-down position so that the cams 20 are all of equal surface elevation at the point of contact with their cam follower rollers 123 and there is no dynamic correction. The apparatus may be rewired to permit insertions of dynamic corrections during the recording run, but they are customarily inserted on playback. The tape 78 is started back through the apparatus when the motors 95 and 82 are started, and the contacts 135 and 136 make through the hole 137 about .3 second later. The making of the contacts 136 and 137 on playback closes a conventional electric circuit and thereby engages clutch 96 to start worm 133 to rotating and thereby permit camshaft 21 to rotate at a corresponding speed.

An important feature of our invention is this provision for triggering the blast on the recording run and the starting of the dynamic correction on the playback run directly by means of an index mark hole 137 carried permanently in the recording medium itself. This feature overcomes timing errors sometimes encountered when the triggering device is not controlled by the medium itself but must be oriented manually in relation to the blast trace recorded upon the tape.

We have provided further means for synchronization and control of the recording and playback run and for obtaining useful information. The embodiment of our invention shown herein contains twenty-seven recording channels of which twenty-four channels are employed to record reflected signals and three channels are employed to record information other than that imparted by reflected waves. All twenty-seven channels are recorded on a tape 7½ inches wide. Of the three channels, one is devoted to recording the time of the initial blast as set off by the making of the contacts 135 and 136, one channel records the arrival time of the direct wave from the blast up the blast hole to a geophone 13 directly above, and the third records a continous signal with frequency of precisely one hundred cycles per second throughout the recording run. All twenty-seven channels can playback their recorded traces. Approximately .15 seconds after the motor button is pressed to start a recording run, a single irregularity is recorded by each head to establish upon the record the amount of static displacement if any which the heads carried before they started recording the reflected signals. This provision affords means to check later for lateral alignment of the heads during the recording run. For improved recording fidelity, a bias frequency 16,000 cycles per second is supplied electrically to each head during the recording run. This bias is supplied by a transistorized oscillator and amplifier which are driven by the power source described earlier and which are situated in the lower case.

From the foregoing, it will be seen that this invention is one well adapted to attain all the ends and objects hereinabove set forth, together with other advantages which are obvious and which are inherent in the method and apparatus.

It will be understood that certain features and subcombinations of our invention are of utility and may be employed without reference to other features and subcombinations and this is contemplated by and within the scope of the claims. Moreover, many possible embodiments may be made of our invention without departing from the scope thereof and various changes in size, shape and materials, as well as changes in the details of the illustrated embodiment may be made without departing from the spirit of the invention. We therefore contemplate by the appended claims to cover any such changes and modifications as fall within the true spirit and scope of our invention.

What we claim is:

1. In an apparatus for dynamic correction for time variations between traces in the simultaneous playing back of a plurality of magnetic traces laterally disposed on magnetic tape by means of a plurality of cams mounted on a cam shaft with each cam moving one pickup head in accordance with a dynamic correction function expresed in its shape, the combination for rotating said camshaft comprising a constant speed motor, a worm member of a worm gear driven by said motor, a worm wheel engaged by said worm and driven by said camshaft, spring drive means tending to drive said camshaft in the same direction as, but at a faster rate than, said motor and worm, said spring drive means being restrainable by said worm, whereby said motor and worm limit the rotation of said worm wheel and camshaft under the drive of said spring drive means to a substantially constant speed.

2. In an apparatus for dynamic correction for time variations in the simultaneous playing back of a plurality of traces laterally disposed on magnetic tape by means of a plurality of cams mounted on a camshaft, the combination comprising a plurality of playback head carriages carried by said apparatus so as to be movable along the path of their recording traces, a roller on each of said carriages for engaging one of said cams, spring loading means for pressing each of said rollers against one of said cams, means for cocking said camshaft before the commencement of each playback so that the force of the rollers against the slopes of said cams tends to cause said camshaft to rotate during portions of the playback in which said rollers engage a relatively steep correction slope upon said cams, an electric motor rotating at substantially constant speed, a worm member of a worm gear connected with said motor by means of a clutch, a worm wheel engaging said worm member and connected with said camshaft thru means for transmitting torque in the operating direction of rotation only from the camshaft toward the motor thereby limiting the speed of rotation of said camshaft by the speed of said constant speed motor, and auxiliary spring means engaging said camshaft with said apparatus for continuing the rotation of said camshaft after said cams have rotated to where the rollers engage points on the cams where there is insufficient slope for rotating the camshaft, said spring loading means and said auxiliary spring means being arranged so that they are reenergized when said camshaft is manually recocked.

3. An apparatus for simultaneous recording on magnetic tape and simultaneous playback of a plurality of laterally disposed magnetic traces, comprising in combination a plurality of normally laterally disposed induction heads for recording and playback, means for applying an electrical signal to each of said heads when recording and means for imparting the electrical signal from each of said heads when playing back, a carriage for each of said heads and means engaging each of said heads with its carriage slidably along the axis of the path of its recording trace, manually operable lever means for fixably positioning each head at a desired point on its said range of movement relative to the other heads for static time correction of each trace, roller means supporting said carriages in said apparatus so as to permit said carriages to move along the path of the axis of their recording traces, rotary cam means engaged with each said carriage and operable continuously to move each of said carriages along its line of mobility in accord with a dynamic correction function embodied in the surface of its cam, a shaft for rotating said cams simultaneously, drive means for rotating said shaft, a constant speed source engaged with said shaft by means of a low torque efficiency gear train whereby the speed of said shaft is limited by the speed of said motor.

4. An apparatus for the simultaneous recording on magnetic tape and simultaneous playback of a plurality of laterally disposed magnetic traces, comprising in combination a plurality of normally laterally disposed induction heads for recording and playback, means for applying an electrical signal to each of said heads when recording and means for imparting the electrical signal from each of said heads when playing back, a carriage for each of said heads and means slidably engaging each of said heads with its carriage to render each of said heads movable with respect to its carriage along the axis of the path of its recording trace, manually operable lever means for fixedly positioning each head at a desired point in its carriage for static time correction of each trace, roller means supporting each said carriage in said apparatus so as to permit each said carriage to move along the axis of its recorded trace, rotary cam means engaged with each said carriage and operable continuously to move each of said carriages along its line of movability in accord with a dynamic correction function embodied in the surface of its cam, spring means for engaging each carriage against its cam and for thereby imparting a rotational force to each cam, means comprising a constant speed source and a worm gear connecting said constant speed source with said cams so that the speed of said cams is limited by the speed of said source, and clutch means for engaging said worm gear with said constant speed source.

5. In an apparatus for simultaneous recording and simultaneous playback of a plurality of magnetic traces corresponding to seismic waves, said apparatus having a plurality of induction heads normally laterally disposed to each other, the improvement comprising an elongated carriage for each head, a flat slide surface inside each half of said carriage, a yoke for supporting said head, slide arms extending outwardly from each side of said yoke, a flat slide surface on the head side of each slide arm, the slide surfaces of the carriage opposing and supporting the respective slides surfaces of the slide arms whereby each of said heads is individually movable forward and backward along the path of its magnetic trace, rack and pinion means engaging each said carriage with its head yoke and each being manually operable by lever means for sliding each of said heads through its movable range, and means for calibrating the displacement of each of said lever means in terms of static time delay or advance of its head along its trace.

References Cited in the file of this patent
UNITED STATES PATENTS

| | | |
|---|---|---|
| 2,243,730 | Ellis | May 27, 1941 |
| 2,440,971 | Palmer | May 4, 1948 |
| 2,765,455 | Meiners | Oct. 2, 1956 |
| 2,806,757 | Cunningham | Sept. 17, 1957 |
| 2,825,885 | Reynolds | Mar. 4, 1958 |
| 2,838,743 | Fredriksson | June 10, 1958 |